US011226842B2

(12) United States Patent
Shimokawa (10) Patent No.: US 11,226,842 B2
(45) Date of Patent: Jan. 18, 2022

(54) INFORMATION PROCESSING APPARATUS AND INFORMATION PROCESSING METHOD

(71) Applicant: FUJIFILM Business Innovation Corp., Tokyo (JP)

(72) Inventor: Noriyuki Shimokawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/105,520

(22) Filed: Nov. 26, 2020

(65) Prior Publication Data

US 2021/0389980 A1 Dec. 16, 2021

(30) Foreign Application Priority Data

Jun. 10, 2020 (JP) .............................. JP2020-101169

(51) Int. Cl.
*G06F 9/48* (2006.01)
*G06F 9/54* (2006.01)

(52) U.S. Cl.
CPC ............ *G06F 9/4881* (2013.01); *G06F 9/542* (2013.01)

(58) Field of Classification Search
None
See application file for complete search history.

(56) References Cited

U.S. PATENT DOCUMENTS

| 2012/0185793 | A1* | 7/2012 | Binsztok | G06Q 10/02 715/772 |
| 2014/0172483 | A1* | 6/2014 | Bellers | G06Q 50/14 705/7.16 |
| 2015/0095229 | A1* | 4/2015 | Breuer | G06Q 40/025 705/44 |
| 2015/0095231 | A1* | 4/2015 | Harold | G06Q 20/4037 705/44 |
| 2015/0178046 | A1* | 6/2015 | Himukashi | G06F 16/35 706/20 |
| 2019/0378136 | A1* | 12/2019 | Efraim | G06Q 20/2295 |
| 2020/0334614 | A1* | 10/2020 | Javaid | G06Q 10/06315 |

FOREIGN PATENT DOCUMENTS

| JP | 2012238036 | 12/2012 |
| JP | 6603428 | 11/2019 |

* cited by examiner

*Primary Examiner* — Charles E Anya
(74) *Attorney, Agent, or Firm* — JCIPRNET (57) ABSTRACT

An information processing apparatus includes a processor configured to: obtain schedule information of plural users; identify, from the obtained schedule information of the plural users, expected occurrences of a trigger event that will cause a particular task that needs to be executed by a designated user; and set a priority order among the plural users based on time information of the expected occurrences of the trigger event.

12 Claims, 8 Drawing Sheets

INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2020-101169 filed Jun. 10, 2020.

BACKGROUND (i) Technical Field

The present disclosure relates to an information processing apparatus.

(ii) Related Art

A user often executes an information processing task on behalf of another user. For example, a task of registering information concerning a certain user in a database is executed by another user.

Japanese Patent No. 6603428 discloses the following technology. Requester data indicating one of a subject user claiming expenses indicated by expenses data and an alternate (designated) subject user and approver data indicating one of an approver making a decision about whether to approve the expenses and an alternate approver are obtained. Based on the requester data and the approver data, if it is judged that expenses claimed by the subject user or the alternate subject user are approved by the same user having claimed the expenses, a warning is issued to inform the user that the expenses are to be approved by the user himself/herself. If the user has still given an approval to the expenses, information that the expenses have been approved by the same user having claimed the expenses is stored in association with the expenses data.

Japanese Unexamined Patent Application Publication No. 2012-238036 discloses the following system. An authorization server distributes a valid alternate user permission ticket to an alternate use terminal. When an application is submitted, together with the valid alternate user permission ticket, from the alternate use terminal, the authorization server requests a processing server to perform a procedure for the application. After the processing server has completed the procedure for the application, the authorization server makes the alternate user permission ticket invalid.

SUMMARY

When a designated user takes charge of tasks on behalf of multiple subject users, the execution order of the tasks may influence the work efficiency. It is assumed that a designated user registers information in a database on behalf of multiple subject users. If it is expected that information concerning a certain subject user to be registered will be generated soon, the designated user can postpone conducting the current task of registering information concerning this subject user until information to be registered is generated. Then, the designated user can register multiple items of information together. The work efficiency is thus improved. If it is expected that information concerning another subject user to be registered will not be generated for a while, the designated user can conduct the current task of this subject user first. As a result, the work efficiency of the overall work of the designated user can be enhanced.

Aspects of non-limiting embodiments of the present disclosure relate to assisting in determining the execution order of multiple tasks to be efficiently executed by a designated user on behalf of multiple subject users.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: obtain schedule information of plural users; identify, from the obtained schedule information of the plural users, expected occurrences of a trigger event that will cause a particular task that needs to be executed by a designated user; and set a priority order among the plural users based on time information of the expected occurrences of the trigger event.

BRIEF DESCRIPTION OF THE DRAWINGS

An exemplary embodiment of the present disclosure will be described in detail based on the following figures, wherein.

DETAILED DESCRIPTION

An exemplary embodiment of the disclosure will be described below in detail with reference to the accompanying drawings.

(Overall Configuration)

Figure 1:
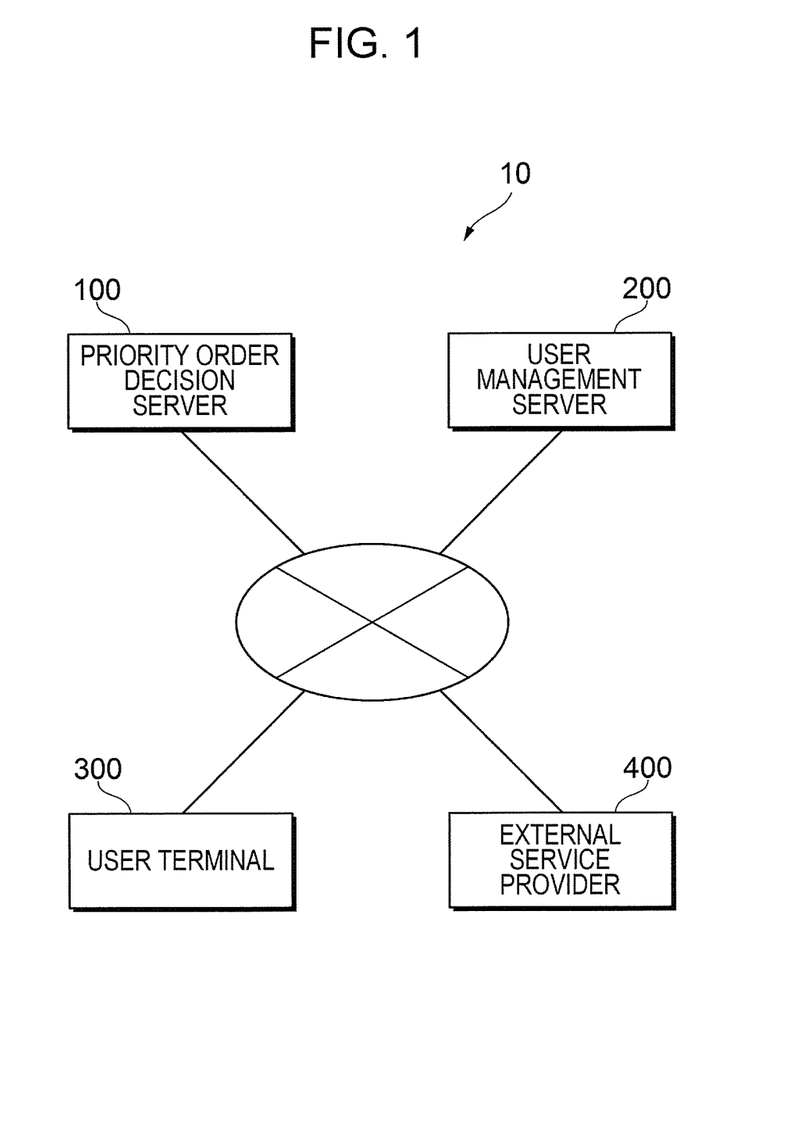
FIG. 1 illustrates the overall configuration of a task decision assist system according to the exemplary embodiment.

FIG. 1 illustrates the overall configuration of a task decision assist system 10 according to the exemplary embodiment. The task decision assist system 10 includes a priority order decision server 100, a user management server 200, and a user terminal 300. The task decision assist system 10 assists a user who executes tasks on behalf of other users in determining which user's task will be conducted first. A user taking charge of other user's tasks will be called a designated user. A user delegating a task to a designated user will be called a subject user. A task of a subject user will simply be called a task. In the example in FIG. 1, a designated user conducts tasks so that subject users can receive a service provided by an external service provider 400. The priority order decision server 100, the user management server 200, and the user terminal 300 are connected with each other via a network. Basically, the external service provider 400 is provided separately from the task decision assist system 10. Depending on a service to be provided, however, the external service provider 400 may be connected with the user terminal 300 via a network.

The priority order decision server 100 is a server that determines the priority order of tasks to be executed by a designated user. The priority order determined by the priority order decision server 100 serves as an index to determining the execution order of tasks by the designated user. The execution order of tasks is determined by the designated user in the end. When determining the execution order, however, the designated user may take the priority order determined by the priority order decision server 100 into consideration. Determining the priority order of tasks by the priority order decision server 100 will be discussed later.

The user management server 200 is a server that manages information concerning each subject user. The information concerning a subject user managed by the user management server 200 includes information about the subject user (hereinafter called subject user information) and information about the schedule of a job, for example, of the subject user (hereinafter called schedule information). The schedule information about a subject user is not limited to information related to a task to be undertaken by the designated user.

Each of the priority order decision server 100 and the user management server 200 may be implemented by a single server machine. Alternatively, the functions of each of the priority order decision server 100 and the user management server 200 may be distributed over multiple servers. The priority order decision server 100 and the user management server 200 may alternatively be virtual servers using network resources.

The user terminal 300 is a terminal device used by the designated user to conduct a task. The user terminal 300 is implemented by an information processing apparatus, such as a personal computer (PC) or a tablet information terminal.

The network may be formed in any configuration if it can be used for performing data exchange between the priority order decision server 100, the user management server 200, and the user terminal 300. Examples of the network are a local area network (LAN), a wide area network (WAN), and the Internet. Plural networks connected with each other via a gateway device, such as a router, may be used. For the network, either one of a wired communication medium and a wireless communication medium may be used.

(Functional Configuration of Priority Order Decision Server)

Figure 2:
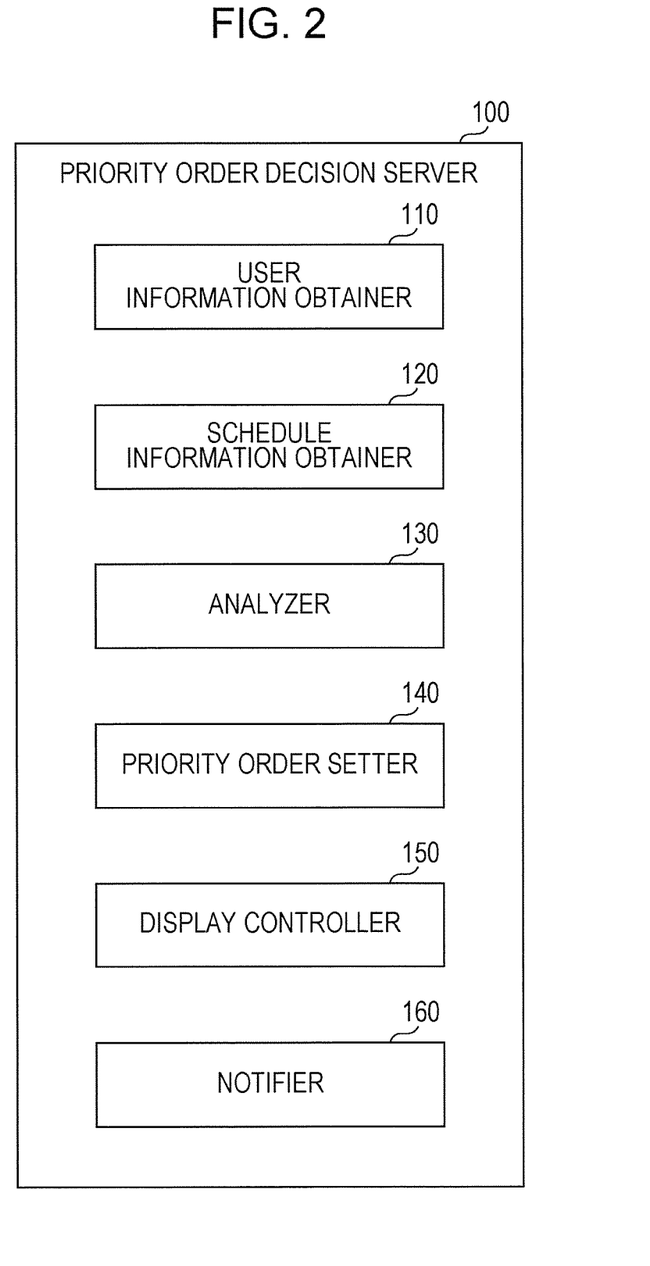
FIG. 2 is a block diagram illustrating an example of the functional configuration of a priority order decision server.

FIG. 2 is a block diagram illustrating an example of the functional configuration of the priority order decision server 100. The priority order decision server 100 includes functions such as a user information obtainer 110, a schedule information obtainer 120, an analyzer 130, a priority order setter 140, a display controller 150, and a notifier 160.

The user information obtainer 110 is a function of obtaining subject user information from the user management server 200. Subject user information obtained by the user information obtainer 110 is not limited to a specific type or a specific configuration as long as an individual subject user can be identified from the subject user information. Subject user information may include identification information for identifying an individual subject user, information indicating the name of the subject user, and information indicating the job title of the subject user.

The schedule information obtainer 120 is a function of obtaining schedule information concerning a subject user from the user management server 200. The schedule of a subject user is that to be managed by the user management server 200. For example, if, in the task decision assist system 10, a certain task of a job of a subject user is executed by a designated user, the schedule of this job of the subject user is that to be managed by the management server 200. As stated above, schedule information of a subject user may also include information other than that about a task to be executed by a designated user.

The analyzer 130 is a function of analyzing the schedule information obtained by the schedule information obtainer 120 for each subject user and extracting the time of the occurrence of an event which makes it necessary for a designated user to execute a task. "An event which makes it necessary for a designated user to execute a task" means that, as a result of the occurrence of this event, it becomes necessary for the designated user to execute the task. For example, it is now assumed that, when a subject user is out of the office on a business trip, for example, receipts for the payment made during this business trip are generated, and registering of such receipts in a database by a designated user is set as a task to be executed by the designated user. In this case, as a result of the occurrence of the event, that is, the subject user going out of the office, it becomes necessary for the designated user to execute the task, that is, registering receipts in a database. In other words, a task of registering receipts is executed as a result of the subject user going out of the office. The event which triggers the execution of a task in this manner will be called a trigger event. The analyzer 130 extracts the time of the occurrence of a trigger event, that is, the scheduled time when a subject user goes out of the office, from the schedule information concerning this subject user.

The priority order setter 140 is a function of setting the priority order of tasks to be executed as a result of the occurrence of a trigger event, in accordance with the conditions based on the time of the occurrence of the trigger event extracted by the analyzer 130. In the above-described example in which the designated user registers receipts issued as a result of a subject user going out, in accordance with the schedules of the individual subject users, the priority order setter 140 sets the priority order of tasks, that is, tasks of registering receipts, to be executed as a result of individual subject users going out of the office.

To set the priority order, various rules are specifically set in accordance with the type and the content of a task and those of the event which triggers the task. In one example, the following rule may be set. As the period from the current time until when the next trigger event occurs for a subject user is longer, a higher priority is given to a task of this subject user. In the above-described example in which the designated user registers receipts issued as a result of a subject user going out, based on the schedules of individual subject users, a higher priority is given to a task of a subject user who has no plan to go out for a longer period. The reason for this is as follows. If the period from the current time until when the next trigger event occurs for a certain subject user is short, the work efficiency may be improved if the task of this subject user is executed later. This will be discussed more specifically below.

If the period from the current time until when the next trigger event occurs for a certain subject user is short, after the next trigger event occurs during this short period of time, the need to execute another task for this subject user arises. Hence, the priority of the current task of this subject user is lowered, and if the next trigger event occurs before executing the current task, the designated user can execute multiple tasks together including the one which needs to be executed by this event. The work efficiency is thus improved. In contrast, if the period from the current time until when the next trigger event occurs for a certain subject user is long, no more task is generated for this subject user for a long period before the occurrence of the next trigger event. That is, the need to execute another task for this subject user does not arise for a while. The designated user can thus execute the current task for this subject user.

In another example concerning the setting of the priority order, the following rule may be set. In a case in which the period from the current time until when the next trigger event occurs for a first subject user is longer than a predetermined period and the above-described period for the second subject user is shorter than the predetermined period, a task of the first subject user is prioritized over that of the second subject user. In the above-described example in which the designated user registers receipts issued as a result of a subject user going out, based on the schedules of individual subject users, a task of a subject user who has no plan to go out for a period longer than the predetermined period is prioritized over the tasks of the other subject users. The reason for this is as follows. If the period from the current time until when the next trigger event occurs for a certain subject user is shorter than the predetermined period, the work efficiency may be improved if the current task of this subject user is executed later. In particular, if such a task is executed after the lapse of the predetermined period, the work efficiency is even further enhanced.

If the period from the current time until when the next trigger event occurs for a certain subject user is shorter than the predetermined period, after the next trigger event has occurred during this predetermined period, the need to execute another task of this subject user arises. Hence, the priority of the current task of this subject user is lowered, and if the next trigger event occurs before executing the current task, the designated user can execute multiple tasks together including the task which needs to be executed by this event. The work efficiency is thus improved. In particular, if the execution of the current task is delayed until after the lapse of the predetermined period, the next trigger event has positively occurred before the execution time of the current task. The designated user can thus execute multiple tasks together after the occurrence of multiple trigger events. In contrast, if the period from the current time until when the next trigger event occurs for a certain subject user is longer than the predetermined period, no more task is generated for this subject user during this predetermined period. That is, the need to execute another task for this subject user during the predetermined period does not arise. The designated user can thus execute the current task for this subject user.

If there are plural tasks of subject users for which the period from the current time until when the next trigger event occurs is longer than the predetermined period, or if there are plural tasks of subject users for which this period is shorter than the predetermined period, the priority order of such tasks is determined based on another rule. As discussed above, for example, as the period from the current time until when the next trigger event occurs for a subject user is longer, a higher priority may be given to a task of this subject user.

As a modified example of the rule for setting the priority order of tasks, if a trigger event continues for a certain length of time, the rule may be set based on the end time of the trigger event. In the above-described example in which the designated user registers receipts issued as a result of a subject user going out, the period of time for which each subject user is out of the office on a business trip or due to being seconded to another company, for example, may be taken into consideration, and the priority order of tasks is determined based on the time when each subject user plans to return to the office, that is, the time when receipts become available to be registered by the designated user.

This will be discussed through illustration of a specific example. It is assumed that one subject user plans to go out of the office in three days according to a schedule A, while another subject user plans to go out of the office in five days according to a schedule B. In this case, according to the above-described rule based on the schedules of subject users, since the period from the current time until when the schedule B is carried out is longer than that of the schedule A, the current task for the subject user related to the schedule B is prioritized over that for the subject user related to the schedule A. However, if the period of time for the schedule A is one week, while that for the schedule B is only one day (the same day), the subject user related to the schedule B returns to the office earlier than that related to the schedule A. This means that receipts concerning the schedule B are issued and become available to be registered by the designated user earlier than those concerning the schedule A. Hence, the priority of the current task for the subject user related to the schedule B is lowered, and the execution of this task is postponed. Because of this priority setting, if the schedule B is completed before the designated user executes the current task, the designated user can register receipts issued as a result of carrying out the schedule B, together with the past receipts. As a result, the work efficiency is enhanced.

If, as discussed above, the rule for the priority order is set based on the end time of a trigger event, it is necessary to obtain information about the end time of a trigger event from the schedule information concerning each subject user. To this end, it is necessary that schedule information concerning each subject user managed by the user management server 200 include information about the continuation period and the end time of a trigger event. In this modified example, a subject user going out of the office is a trigger event and the rule for the priority order is set based on the end time of this trigger event. If a subject user returning to the office is set to be a trigger event, the above-described rule may be regarded as the one based on the time of the occurrence of the trigger event.

The display controller 150 is a function of generating a display screen showing a list of subject users arranged in accordance with the priority order set by the priority order setter 140 and sending the display screen to the user terminal 300. Upon receiving the display screen, the user terminal 300 displays the display screen on a display. Details of the display screen will be discussed later.

The notifier 160 is a function of sending a notification to a designated user who undertakes a task for a certain subject user if a predetermined notifying condition is satisfied for this task. The notification is an instruction for the designated user to execute the task. The notifying condition is specifically set in accordance with the content of a task or the type of trigger event. The notifying condition may be the condition that a certain period has elapsed after the most recent occurrence of a trigger event for a certain subject user.

The notifier 160 may notify a designated user that a prerequisite for executing a task has not been provided. In the above-described example in which the designated user registers receipts issued as a result of a subject user going out, the submitting of receipts by the subject user is assumed to be a prerequisite for executing a task. If the subject user has not submitted receipts for a certain period after going out and returning to the office, the notifier 160 may send this information to the designated user who takes charge of this task.

The notifying condition may be the condition that the period from the current time until when the next trigger event occurs for a subject user has reached a certain period of time, such as the above-described predetermined period. In this case, the notifier 160 may notify the designated user that a trigger event will occur in a certain period of time and the work efficiency will be improved if the user postpones executing the current task until then.

The notifier 160 may send a notification to a subject user if a specific condition is satisfied. In the above-described example in which the designated user registers receipts issued as a result of a subject user going out, if the submitting of receipts by the subject user is assumed to be a prerequisite for executing a task, the notifier 160 may send an instruction to submit receipts to the subject user.

(Functional Configuration of User Management Server)

Figure 3:
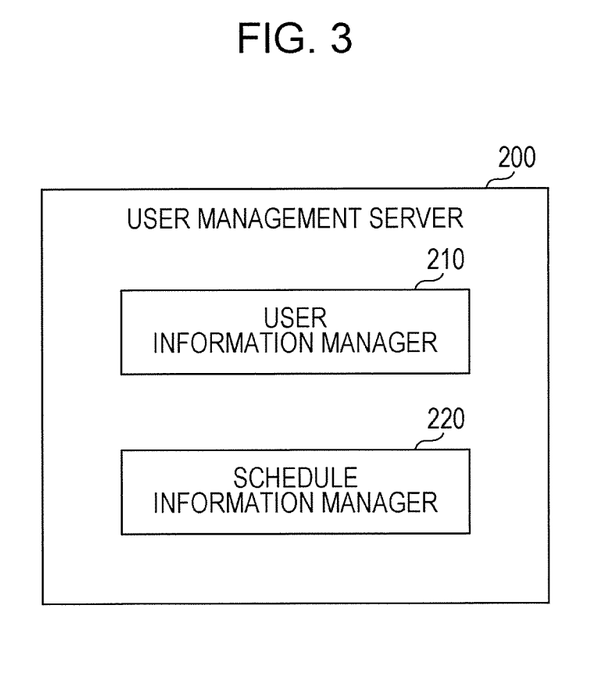
FIG. 3 is a block diagram illustrating an example of the functional configuration of a user management server.

FIG. 3 is a block diagram illustrating an example of the functional configuration of the user management server 200. The user management server 200 manages subject user information and schedule information concerning each subject user. The user management server 200 includes functions such as a user information manager 210 and a schedule information manager 220.

The user information manager 210 is a function of managing subject user information. Subject user information is information for identifying an individual subject user. The content of subject user information to be managed by the user information manager 210 is not limited to a particular type and may be determined in accordance with the specifications and the operation of the task decision assist system 10. For example, as discussed in the explanation of the user information obtainer 110 of the priority order decision server 100, identification information about a subject user, the name or the account name of the subject user, and the name or the code for identifying the job title of the subject user may be managed as subject user information.

The schedule information manager 220 is a function of managing schedule information about the schedule of an individual subject user. The schedule information managed by the schedule information manager 220 is information about the schedule of each subject user handled in the task decision assist system 10. For example, if a task of a subject user is related to a job of this subject user, the schedule of this job is managed by the schedule information manager 220. Specific examples of the scheduled items regarding a job are going out of the office, meetings, individual tasks related to the job. As stated above, schedule information may include information other than that about a task. That is, schedule information may include information about an event other than a trigger event for a task. Each scheduled item is appended with information about the date, purpose, place, and party concerned, for example.

(Hardware Configuration of Priority Order Decision Server and User Management Server)

Figure 4:
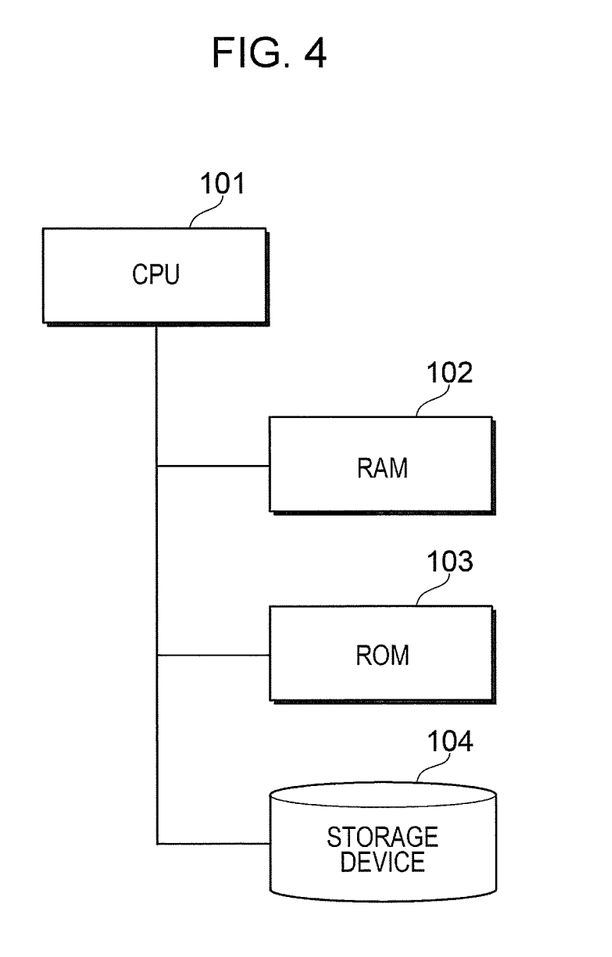
FIG. 4 is a block diagram illustrating an example of the hardware configuration of a computer implementing each of the priority order decision server and the user management server.

Each of the priority order decision server 100 and the user management server 200 is implemented by a computer. FIG. 4 is a block diagram illustrating an example of the hardware configuration of a computer implementing each of the priority order decision server 100 and the user management server 200. The computer that implements each of the priority order decision server 100 and the user management server 200 includes a central processing unit (CPU) 101, which is a processor, and storages such as a random access memory (RAM) 102, a read only memory (ROM) 103, and a storage device 104. The RAM 102 is a main storage (main memory) and is used as a work memory for the CPU 101 to execute processing. The ROM 103 stores programs and data, such as set values. The CPU 101 can read a program and data directly from the ROM 103 and execute processing. The storage device 104 is a storage for storing programs. The CPU 101 reads a program from the storage device 104 into the main storage and executes it. The results of processing executed by the CPU 101 are also stored and retained in the storage device 104. As the storage device 104, a magnetic disk drive or a solid state drive (SSD), for example, is used.

If the priority order decision server 100 is implemented by the computer shown in FIG. 4, the user information obtainer 110, the schedule information obtainer 120, the analyzer 130, the priority order setter 140, the display controller 150, and the notifier 160 are implemented as a result of the CPU 101 executing a certain program, for example. Data and information to be processed by the user information obtainer 110, the schedule information obtainer 120, the analyzer 130, the priority order setter 140, the display controller 150, and the notifier 160 and the processing results and a display screen created by the display controller 150 are stored in the storage device 104, for example.

If the user management server 200 is implemented by the computer shown in FIG. 4, the user information manager 210 and the schedule information manager 220 are implemented as a result of the CPU 101 executing a certain program, for example. A data file of subject user information managed by the user information manager 210 and that of schedule information managed by the schedule information manager 220 are stored in the storage device 104, for example.

(Configuration of User Terminal)

Figure 5:
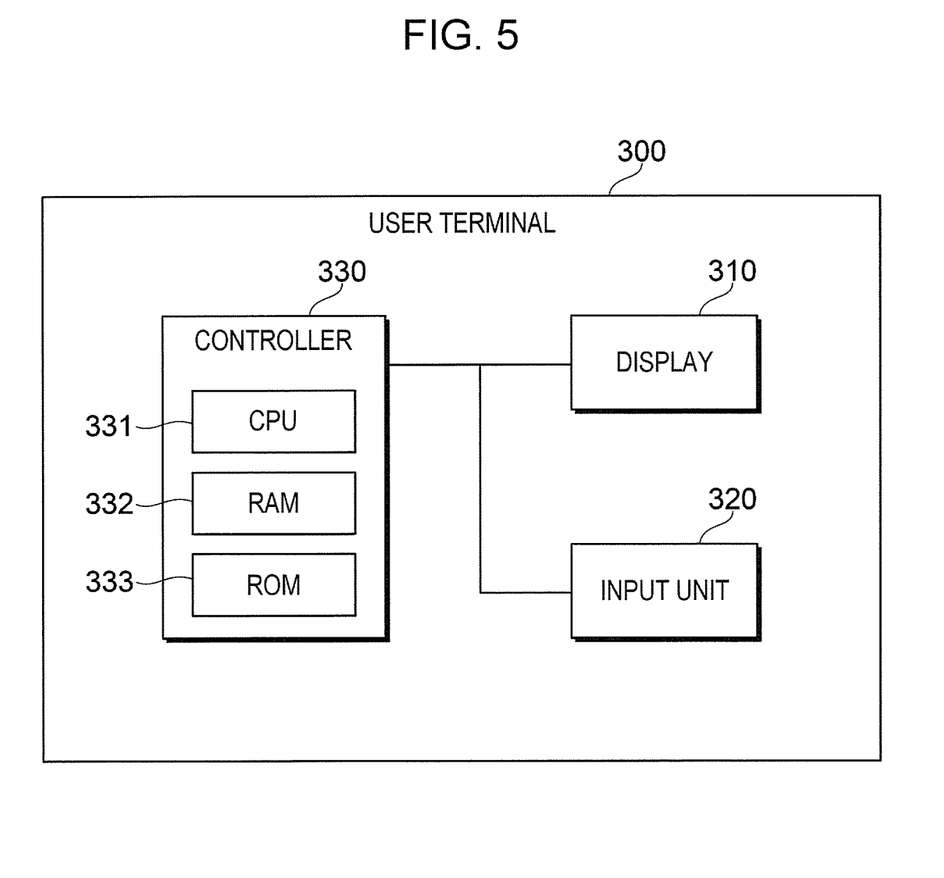
FIG. 5 is a block diagram illustrating an example of the configuration of the user terminal.

FIG. 5 is a block diagram illustrating an example of the configuration of the user terminal 300. The user terminal 300 includes a display 310, an input unit 320, and a controller 330. The user terminal 300 is implemented by an information processing apparatus, such as a PC. The configuration of the user terminal 300 is not limited to that shown in FIG. 5. For example, the user terminal 300 may also include a storage device for retaining various items of data to be processed and processing results and peripheral devices implementing various functions under the control of the controller 330. For example, an image processing apparatus integrating a computer as the controller 330 and including an image reader and an image forming unit may be used as the user terminal 300.

The display 310 is a device that displays screens, such as an operation screen and an information presenting screen. The display 310 displays a display screen obtained from the priority order decision server 100. As the display 310, a liquid crystal display, for example, is used.

The input unit 320 is a device that receives an input operation from a user. The input unit 320 receives an operation performed by a user in accordance with an operation screen, such as a user interface (UI) screen, displayed on the display 310. As the input unit 320, devices, such as a keyboard and a mouse, are used. A touchscreen, which serves as a UI, may be formed by using a touch senor as the input unit 320 and a liquid crystal display as the display 310.

The controller 330 is a device that controls the user terminal 300. The controller 330 includes a CPU 331, a RAM 332, and a ROM 333. The RAM 332 is a main storage and is used as a work memory for the CPU 331 to execute processing. The ROM 333 stores programs and data, such as set values. The CPU 331 can read a program and data directly from the ROM 333 and execute processing.

(Operation of Priority Order Decision Server)

Figure 6:
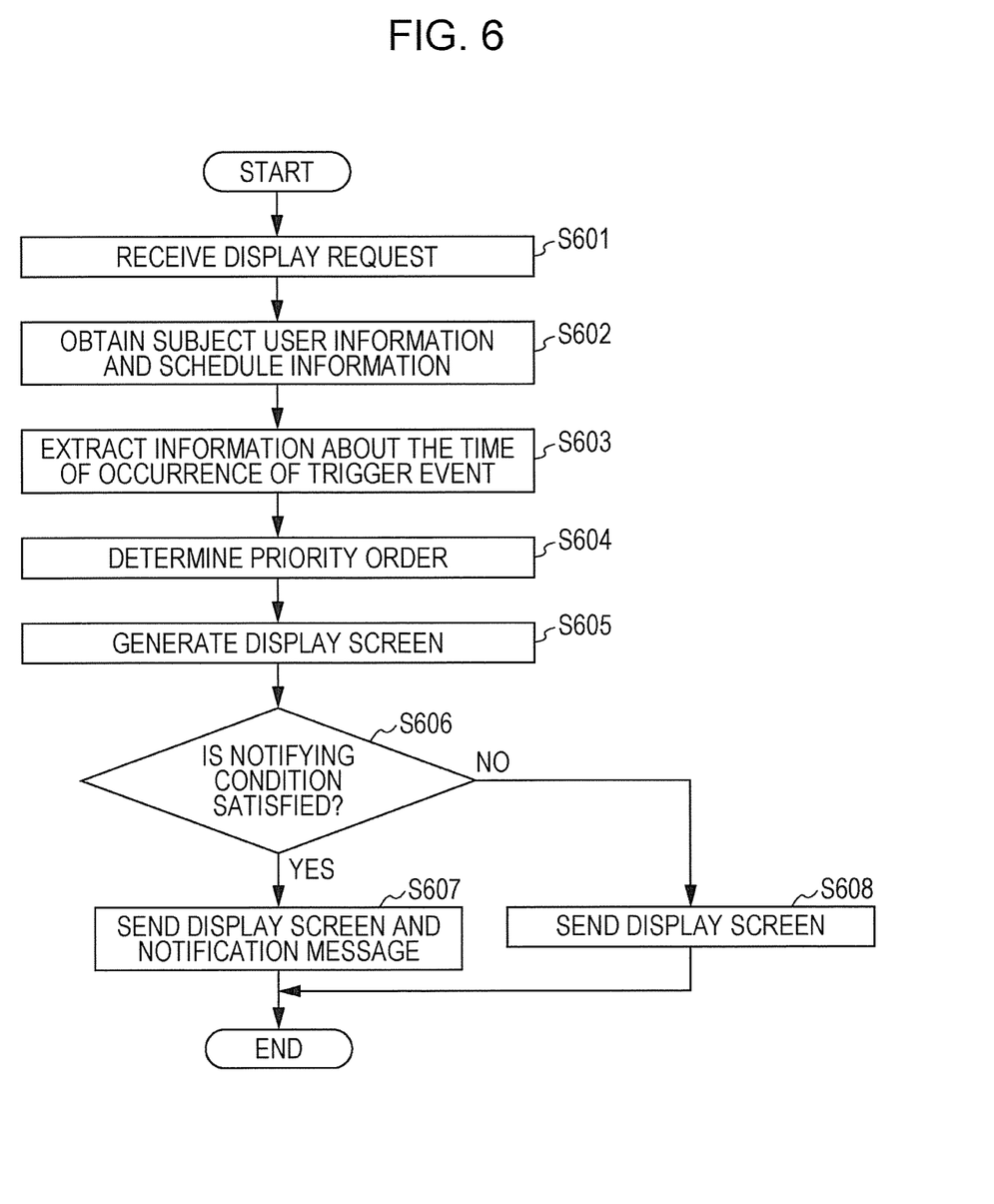
FIG. 6 is a flowchart illustrating an example of the operation executed by the priority order decision server.

FIG. 6 is a flowchart illustrating an example of the operation executed by the priority order decision server 100. The operation shown in FIG. 6 is executed when the priority order decision server 100 determines the priority order of tasks in response to a request from the user terminal 300.

A designated user operates the user terminal 300 and requests the priority order decision server 100 to send a display screen showing subject users. Such a request will be called a display request. Upon receiving the display request from the user terminal 300 in step S601, the priority order decision server 100 accesses the user management server 200. In step S602, by using the user information obtainer 110 and the schedule information obtainer 120, the priority order decision server 100 obtains subject user information and schedule information concerning all subject users whose tasks can be executed by the designated user.

Then, in step S603, by using the analyzer 130, the priority order decision server 100 extracts information about the time of the occurrence of a trigger event for each subject user, based on the obtained subject user information and schedule information. After extracting the time of the occurrence of the trigger event for all the subject users, in step S604, by using the priority order setter 140, the priority order decision server 100 determines the priority order of the tasks in accordance with the extracted time of the occurrence of the trigger event of each subject user. Then, in step S605, by using the display controller 150, the priority order decision server 100 generates a display screen reflecting the priority order determined in step S604. By using the notifier 160, the priority order decision server 100 judges in step S606 whether the notifying condition is satisfied. If the notifying condition is satisfied (YES in step S606), in step S607, the priority order decision server 100 returns the generated display screen and a notification message to the user terminal 300 in response to the display request. If the notifying condition is not satisfied (NO in step S606), in step S608, the priority order decision server 100 returns only the generated display screen to the user terminal 300 in response to the display request.

In the above-described example of the operation executed by the priority order decision server 100, when the priority order decision server 100 has determined the priority order of tasks in response to the display request from the user terminal 300, it judges whether the notifying condition is satisfied. Alternatively, the priority order decision server 100 may make this judgement independently of the decision of the priority order and send a notification to the user terminal 300. For example, it is assumed that the notifying condition is the condition that a certain period has elapsed after the occurrence of a trigger event. In this case, on a regular basis, the priority order decision server 100 obtains past schedule information from the user management server 200. If the priority order decision server 100 finds a task which has not yet been executed even after the lapse of the certain period after the occurrence of a corresponding trigger event, it sends an instruction to execute the task to the user terminal 300 by using the notifier 160.

(Example of Display Screen)

Figure 7:
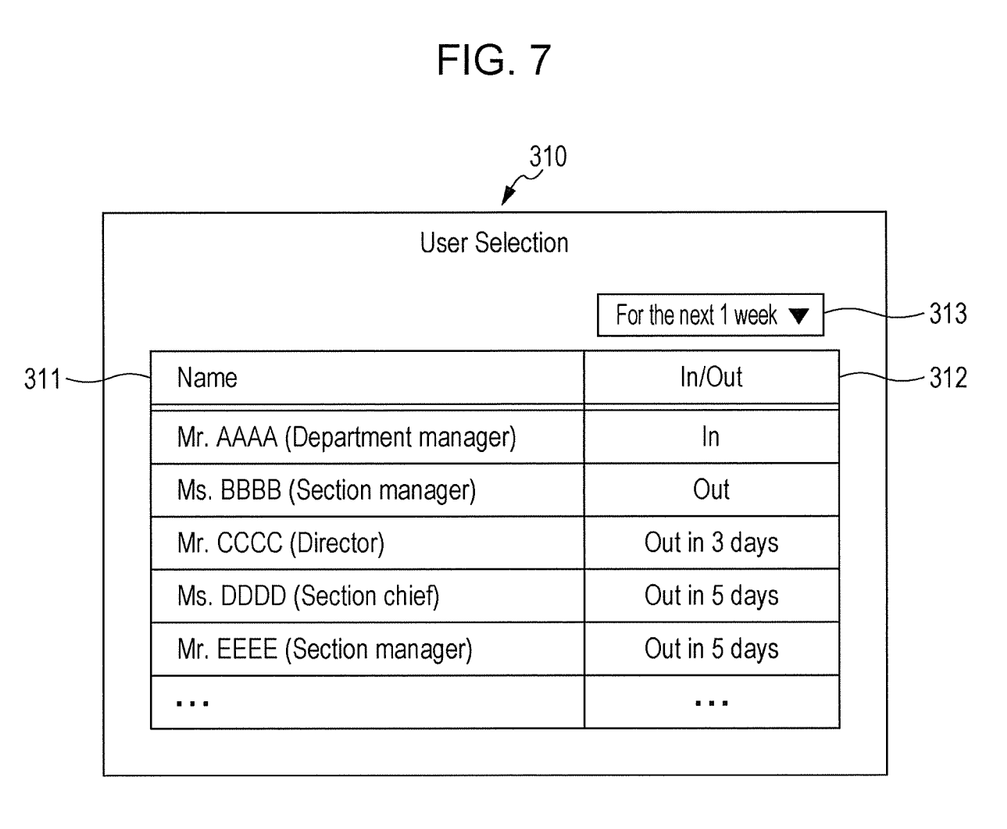
FIG. 7 illustrates a display example of a display screen displayed on the user terminal.

FIG. 7 illustrates a display example of the display screen displayed on the user terminal 300. In the example in FIG. 7, the display screen displayed on the display 310 has a subject user display field 311, a schedule information display field 312, and a subject period display field 313. In the example in FIG. 7, a subject user going out of the office (on a business trip) is a trigger event, and the display screen indicates a list of subject users and the schedules of their business trips.

In the subject user display field 311, the name (such as Mr. AAAA and Ms. BBBB) and the job title (such as a department manager or a section manager) of each subject user are indicated. These items of information are extracted from the subject user information obtained from the user management server 200. Each row of the subject user display field 311 serves as a button object to be selected by a designated user. The designated user selects the row of the subject user display field 311 corresponding to the task to be executed next. If the display 310 is a touchscreen, the designated user can touch the corresponding row of the subject user display field 311. When the designated user has selected one of the subject users, the display screen of the display 310 is switched to a task screen for executing the task of the selected subject user.

In the schedule information display field 312, the situation of each subject user, that is, whether the subject user is currently in or out and when the subject user is going out on a business trip, which serves as a trigger event, is displayed. In the example in FIG. 7, the start time of a business trip is indicated as "out in XX days". If a subject user is currently out of the office, the situation of this user is indicated as "out". If a subject user has no plan to go on a business trip, the situation of this user is indicated as "in".

The subject period display field 313 indicates the subject period of scheduled business trips to be displayed in the list. In the example in FIG. 7, "for the next one week" is indicated in the subject period display field 313 to show that the schedules of business trips from the current time to one week later are displayed. The subject period display field 313 serves as a button object. The designated user selects the subject period display field 313, and then, a selection menu, for example, is displayed, and the designated user can select an option of the subject period.

In the example shown in FIG. 7, the subject users in the list are arranged in order of low to high priority. The list shows that "Mr. AAAA (department manager)" has no plan to go on a business trip for the next one week. Mr. AAAA has the lowest priority and tops the list. The reason why the subject user having no plan to go out tops the list is that the timing of the execution of the current task of this subject user does not influence the work efficiency. "Ms. BBBB (section manager)" is currently out of the office. Ms. BBBB has the second lowest priority and is placed in the second position in the list. In this manner, as the number of days left before a subject user goes out of the office is greater, a higher priority is set for this user. The subject users are displayed in the list in ascending order of the number of days left.

In the example in FIG. 7, the priority order of tasks is set based on the start time of a business trip. When determining the priority order, the end time of a business trip may also be taken into consideration. For example, Ms. BBBB (section manager) is currently out of the office, and Mr. CCCC (director) goes on a business trip in three days. If, however, Ms. BBBB returns to the office in five days and Mr. CCCC is out of the office for only one day, Mr. CCCC returns to the office earlier than Ms. BBBB. It is now assumed that the task conducted by the designated user is registering of receipts for the payment during a business trip in a database. In this case, receipts issued for the business trip of Mr. CCCC become available earlier than those of Ms. BBBB and the designated user can start registering the receipts of Mr.

CCCC earlier. In this manner, when setting the priority order of tasks, the end time of a business trip may also be taken into consideration, and the task for Ms. BBBB may be prioritized over that for Mr. CCCC. In this case, in the list shown in FIG. 7, Mr. CCCC (director) is placed in a higher position than Ms. BBBB (section manager).

Figure 8:
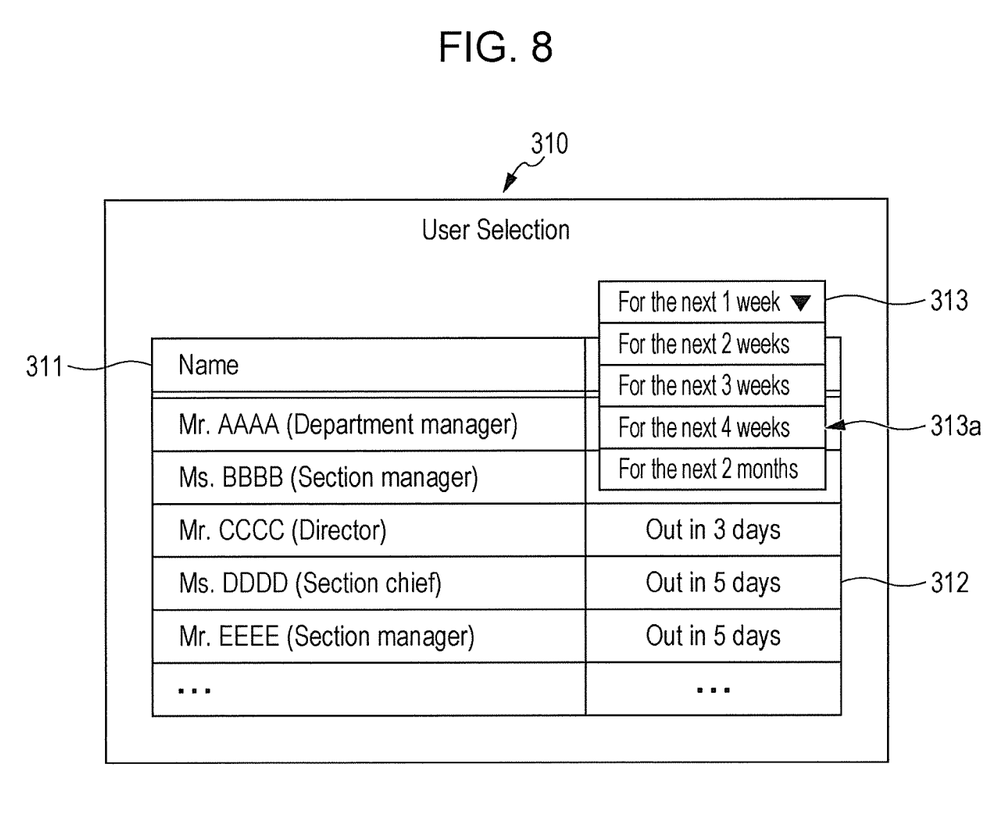
FIG. 8 illustrates a display example when the subject period is selected on the display screen shown in FIG. 7.

FIG. 8 illustrates a display example when the subject period is selected on the display screen shown in FIG. 7. On the display screen in FIG. 8, the subject user display field 311 and the schedule information display field 312 are the same as those of the display screen in FIG. 7. As stated above, the subject period display field 313 serves as a button object. In the example in FIG. 8, the subject period display field 313 is operated, and a selection menu is displayed. More specifically, when the designated user selects the subject period display field 313 on the display screen in FIG. 7 by clicking it with a mouse or touching it on the touchscreen, a pull-down menu 313a is displayed to indicate options of the subject period. When the designated user selects one of the options on the pull-down menu 313a, subject users and their schedules are displayed in the subject user display field 311 and in the schedule information display field 312 in accordance with the selected option of the subject period.

While the exemplary embodiment has been discussed above, the technical scope of the disclosure is not restricted thereto.

For example, in the above-described exemplary embodiment, subject user information is stored in the user management server 200. However, the subject users are users receiving a service from the external service provider 400 and may be managed by the external service provider 400. In this case, the user information obtainer 110 of the priority order decision server 100 obtains subject user information concerning the subject users from the external service provider 400 instead of from the user management server 200.

The above-described exemplary embodiment has been discussed such that schedule information managed by the schedule information manager 220 of the user management server 200 may include information other than that related to a task, such as information concerning a trigger event. The schedule information may include information about a task itself to be conducted by a designated user. In this case, the execution time of the task is indicated in the schedule information concerning a subject user. When the execution time has arrived, the notifier 160 of the priority order decision server 100 may send an instruction to execute the task to the designated user, based on the schedule information obtained from the user management server 200.

Various other modifications and alternatives for the configuration of the exemplary embodiment may be made without departing from the technical scope of the disclosure and they are encompassed in the disclosure.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A priority order decision server comprising:
a processor that:
obtain via user information obtainer, schedule information of a plurality of users, from a user management server,
identify via schedule information obtainer, from the obtained schedule information of the plurality of users, expected occurrences of a trigger event that will cause a particular task that needs to be executed by a designated user,
set via a priority order setter, a priority order among the plurality of users based on time information of the expected occurrences of the trigger event, wherein a first priority order of a first expected occurrence of the trigger event that occurs later is higher than a second priority order of a second expected occurrence of the trigger event that occur earlier, and
send via a notifier, a notification to at least one of the plurality of user based on a specific condition for the particular task, wherein when the specific condition is not provided within a certain period an additional notification related the specific condition is sent to at least one of the plurality of user.

2. The priority order decision server according to claim 1, wherein the processor:
causes a display to display a screen showing the plurality of users arranged in accordance with the set priority order.

3. The priority order decision server according to claim 2, wherein the plurality of users include a first user and a second user, wherein the schedule information includes a first expected occurrence of the trigger event to the first user and a second expected occurrence of the trigger event to the second user, and
wherein the processor
sets the priority order so that the first user is given a higher priority than the second user in a case where a time of the first expected occurrence of the trigger event is farther than a time of the second expected occurrence of the trigger event is from a predetermined time point.

4. The priority order decision server according to claim 3, wherein the predetermined time point is a current time.

5. The priority order decision server according to claim 2, wherein the plurality of users include a first user and a second user, wherein the schedule information includes a first expected occurrence of the trigger event to the first user and a second expected occurrence of the trigger event to the second user, and wherein the processor
sets the priority order so that the first user is given a higher priority than the second user in a case where a first distance from the first expected occurrence of the trigger event to a predetermined time point is longer than a predetermined period and a second distance from the second expected occurrence of the trigger event to the predetermined time point is shorter than the predetermined period.

6. The priority order decision server according to claim 5, wherein the predetermined time point is a current time.

7. The priority order decision server according to claim 1, wherein the processor
sends any user of the plurality of users a notification in response to the user satisfying a predetermined notifying condition.

8. The priority order decision server according to claim 7, wherein the notifying condition is an elapse of a certain period of time after a last occurrence of the trigger event to the user.

9. The priority order decision server according to claim 1, wherein the trigger event is a trip, and wherein the task is related to expenses of the trip.

10. The priority order decision server according to claim 1, wherein the designated user is a person set as a manager of the plurality of users.

11. A priority order decision server comprising:
a processor that:
    obtain via user information obtainer, schedule information of a plurality of users, from a user management server,
    identify via schedule information obtainer, from the obtained schedule information of the plurality of users, a schedule of each of the plurality of users being out, particular tasks of the plurality of users being executed by a designated user in response to the corresponding users being out,
    set via a priority order setter, a priority order among the plurality of users based on time information of the schedule of each of the plurality of users being out, wherein a first priority order of a first expected occurrence of the trigger event that occurs later is higher than a second priority order of a second expected occurrence of the trigger event that occur earlier, and
send via a notifier, a notification to at least one of the plurality of user based on a specific condition for the particular task, wherein when the specific condition is not provided within a certain period an additional notification related the specific condition is sent to at least one of the plurality of user.

12. A priority order decision method comprising:
obtaining via user information obtainer, schedule information of a plurality of users from a user management server;
identifying via schedule information obtainer, from the obtained schedule information of the plurality of users, expected occurrences of a trigger event that will cause a particular task that needs to be executed by a designated user;
setting via a priority order setter, a priority order among the plurality of users based on time information of the expected occurrences of the trigger event, wherein a first priority order of a first expected occurrence of the trigger event that occurs later is higher than a second priority order of a second expected occurrence of the trigger event that occur earlier, and
sending via a notifier, a notification to at least one of the plurality of user based on a specific condition for the particular task, wherein when the specific condition is not provided within a certain period an additional notification related the specific condition is sent to at least one of the plurality of user.

* * * * *